United States Patent Office 2,931,810
Patented Apr. 5, 1960

2,931,810

PHENOTHIAZINE DERIVATIVES

Harry Louis Yale, New Brunswick, and Francis Alexander Sowinski, Nixon, N.J., assignors to Olin Mathieson Chemical Corporation, New York, N.Y., a corporation of Virginia No Drawing. Application February 4, 1957
Serial No. 637,878

9 Claims. (Cl. 260—243)

This invention relates to new 10-(aminoalkyl)-tertiary-alkyl-phenothiazines (and their salts) having valuable therapeutic properties and processes for the preparation thereof.

The therapeutically active compounds of this invention include phenothiazines of the general formula

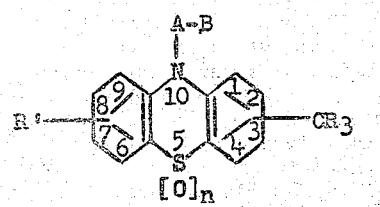

wherein A is a lower alkylene radical, B is a basic nitrogen-containing radical of less than twelve carbon atoms, R is lower alkyl (which may be the same or different), R' is hydrogen, halogen, lower alkyl, lower alkoxy or trifluoromethyl, and $n$ is zero, one or two; and salts thereof. Among the suitable radicals represented by the symbol B are: amino; (lower alkyl)amino; di(lower alkyl)-amino; (hydroxy-lower alkyl)amino; di(hydroxy-lower alkyl)amino; basic saturated monocyclic heterocyclic radicals of less than twelve carbon atoms, as exemplified by piperidyl [i.e., piperidino, 2-piperidyl, 3-piperidyl and 4-piperidyl]; (lower alkyl)piperidyl [e.g., 2, 3, or 4-(lower alkyl)piperidino or 2, 3, or 4-(N-lower alkyl)-piperidyl]; di(lower alkyl)piperidyl [e.g., 2,4-, 2,6- or 3,5-di(lower alkyl)piperidino, or 2, 3, or 4-(N-lower alkyl-2, 3, or 4-lower alkyl)piperidyl]; (lower alkoxy)-piperidyl; pyrrolidyl; (lower alkyl)pyrrolidyl; di(lower alkyl)pyrrolidyl; (lower alkoxy)pyrrolidyl; morpholinyl [i.e., morpholino, 2-morpholinyl and 3-morpholinyl]; (lower alkyl)morpholinyl; di(lower alkyl)morpholinyl; (lower alkoxy)morpholinyl; thiamorpholinyl; (lower alkyl)thiamorpholinyl; di(lower alkyl)thiamorpholinyl; (lower alkoxy)thiamorpholinyl; piperazyl; (lower alkyl)-piperazyl (e.g., N⁴-methylpiperazino); di(lower alkyl)-piperazyl; (lower alkoxy)piperazyl; and (lower carbalkoxy)piperazyl; and N-oxides of those radicals which are tertiary amines. The terms "lower alkyl," "lower alkoxy" and "lower alkylene," as employed herein, include both straight and branched chain radicals of less than eight carbon atoms. The particularly preferred compounds are those wherein the tertiary-alkyl radical is in the 2-position; A is a lower alkylene radical of two to three carbon atoms (i.e., ethylene, trimethylene-1,3 and propylene-1,2); B represents a di(lower alkyl)amino radical; and R' is hydrogen.

As to the salts of the phenothiazines, those coming within the purview of this invention include the acid-addition salts, particularly the non-toxic acid-addition salts. Acids useful for preparing the acid-addition salts include, inter alia, inorganic acids, such as the hydrohalic acids (e.g., hydrochloric and hydrobromic acid), sulfuric acid, nitric acid, phosphoric acid and boric acid, and organic acids, such as oxalic, maleic, tartaric, citric, acetic and succinic acid, theophylline and 8-chloro-theophylline.

The 10-(aminoalkyl)-tertiary alkyl-phenothiazines of this invention and the acid-addition salts thereof are therapeutically active compounds which are utilizable as antihistaminic, antiemetic, and especially ataractic (tranquilizing) agents. Thus, 10-(3-dimethylaminopropyl)-2-tert.-butyl-phenothiazine hydrochloride is more potent than chloropromazine as a tranquilizing agent (without the pronounced undesired sedation side-effect displayed by the latter) and can be administered perorally in the same manner as the latter compound in the treatment of certain psychotic states. The activity of the compounds of this invention is surprising in view of the fact that the corresponding 2-primary and secondary alkyl derivatives [e.g., 10-(3-dimethylaminopropyl)-2-methylphenothiazine hydrochloride] are pharmacologically inactive and do not display any significant amount of tranquilizing activity.

The compounds of this invention, wherein $n$ is zero, can be prepared by one of the processes of this invention, namely, by reacting a tertiary alkyl-phenothiazine with an amino-(lower alkanoyl)halide, thereby forming the 10-aminoalkanoyl derivative, which is then reduced, as by treatment with lithium aluminum hydride, to the aminoalkyl derivative. These compounds can also be formed by reacting a tertiaryalkylphenothiazine with a halo-acyl halide (e.g., α-chloroacetyl chloride) and the resulting 10-halo-acyl derivative then either reacted with an appropriate amine and the resultant 10-amino-acyl derivative reduced to yield the 10-aminoalkyl derivative, or first reduced and then aminated. A preferred method for preparing the compounds of this invention, wherein $n$ is zero or two, involves the reaction of 2-(or 4-) tertiary-alkylphenothiazine (or the S,S-dioxide derivative thereof if a compound wherein $n$ is two is desired) with a compound of the formula B—A—X, wherein B and A are as hereinbefore defined and X is halogen (e.g., iodine, bromine and preferably chlorine), in the presence of an acid acceptor, such as an alkali metal, an alkali metal alcoholate, an alkali metal hydride, an organic lithium derivative, such as butyl lithium, and (preferably) an alkali metal amide (e.g., sodamide).

To prepare the S-monoxides and N,S-dioxides of this invention, the corresponding phenothiazine, wherein $n$ is zero, is treated with hydrogen peroxide. The chemical nature of the resulting product will depend on the proportion of oxidizing agent to phenothiazine. If approximately one mole of the oxidizing agent per mole of phenothiazine is employed, an S-monoxide is formed; if, however, approximately two moles of the oxidizing agent per mole of phenothiazine is used, an N,S-dioxide is formed.

To prepare phenothiazine products wherein $n$ is two (i.e., S,S or 5,5-dioxides), the desired phenothiazine nucleus is first acylated, e.g., treated with an acyl halide and/or an acid anhydride to give a 10-acyl derivative; the latter is then heated with at least two equivalents of a peracid, such as peracetic acid (commercially available as 40% peracetic acid in acetic acid, or the peracetic acid formed in situ by mixing the required amount of aqueous hydrogen peroxide with glacial acetic acid); generally, during this process both oxidation and hydrolysis occur so that the product isolated is the phenothiazine-5,5-dioxide. The phenothiazine-5,5-dioxide is then converted to a 10-aminoalkyl derivative as described hereinbefore.

The free bases formed by either of the first two alternative methods can then, if desired, be converted to acid-addition salts by treatment with the desired acid. This reaction is preferably conducted in an inert organic solvent under substantially anhydrous conditions by treat-

EXAMPLE 1

*2-tert.-butyl-10-(3-dimethylaminopropyl)phenothiazine hydrochloride*

(a) *N-(3-tert.-butylphenyl)anthranilic acid.*—A solution of 227 g. of o-chlorobenzoic acid, 96 g. of potassium hydroxide and 1250 ml. of amyl alcohol is distilled until approximately 300 ml. of distillate is obtained. To the residual reaction mixture are added 179 g. of m-tert.-butyl-aniline and 15 g. of copper bronze powder and the whole stirred and refluxed for two hours. The cooled mixture is treated with a solution of 96 g. of potassium hydroxide in 500 ml. of water and then steam distilled. The residue from the steam distillation is treated with decolorizing carbon, filtered and the filtrate neutralized. The product, N-(3-tert.-butylphenyl)anthranilic acid separates. The yield is about 229 g., M.P. about 151–153° C.

(b) *3-tert.-butyldiphenylamine.* — The product from 1(a), 229 g., and 23 g. of copper bronze are heated for three hours at about 235°, the mixture is cooled and the product isolated by ether extraction to give about 137 g. of 3-tert.-butyldiphenylamine, B.P. about 136–138° C. (0.03 mm.).

(c) *2-tert.-butylphenothiazine.* — 3-tert.-butyldiphenylamino, 135 g., 38.5 g. of sulfur and 4.4 g. of iodine are stirred and heated for 0.75 hour at about 145–155°. The cooled mass is dissolved in 250 ml. of boiling toluene and the solution cooled to give about 126 g. of 2-tert.-butylphenothiazine, M.P. about 166–167° C.

(d) *2-tert.-butyl-10-(3-dimethylaminopropyl)phenothiazine.*—A mixture of 19.1 g. of 2-tert.-butylphenothiazine, 3.2 g. of sodamide and 400 ml. of dry toluene are stirred and refluxed for about three hours. The reaction mixture is cooled, 88 ml. of a 1.14 molar toluene solution of 3-dimethylaminopropyl chloride is added and the whole stirred and refluxed an additional three hours. The mixture is filtered, cooled and extracted with two 200-ml. portions of N HCl. The combined acid extracts are washed with ether and made alkaline with an excess of 20% sodium hydroxide solution. The oil which separates is isolated by ether extraction, the ether extracts are dried, concentrated and distilled to give about 21.4 g. of 2-tert.-butyl-10-(3-dimethylaminopropyl)phenothiazine, B.P. about 196–198° C. (0.4 mm.).

(e) *2-tert.-butyl-10-(3-dimethylaminopropyl)phenothiazine hydrochloride.*—The product from 1(d), 21.4 g., in 250 ml. of dry ether is cooled and treated with a slight excess of ethereal hydrogen chloride. The hydrochloride which separates out is filtered, weighs about 21.6 g., and melts at about 204–205° C.

EXAMPLE 2

*2-tert.-butyl-10-(3-dimethylaminopropyl)phenothiazine oxalate*

The product from 1(d), 10.7 g., in 100 ml. of dry acetonitrile is treated with a solution of 2.8 g. of anhydrous oxalic acid in 30 ml. of dry acetonitrile. The oxalate salt of 2-tert.-butyl-10-(3-dimethylaminopropyl)phenothiazine separates rapidly and is filtered off. It weighs about 12.5 g.

EXAMPLE 3

*2-tert.-butyl-10-(3-dimethylaminopropyl)phenothiazine-5-oxide oxalate*

The oxalate salt from Example 2, 6.25 g., in 100 ml. of warm 95% ethanol is treated with 2.2 g. of 30% hydrogen peroxide solution. The mixture is refluxed for three hours and cooled. The 2-tert.-butyl-10-(3-dimethylaminopropyl)phenothiazine-5-oxide oxalate crystallizes and is isolated by filtration.

EXAMPLE 4

*2-tert.-butyl-10-(3-dimethylaminopropyl)phenothiazine-N,5-dioxide oxalate*

By employing 4.4 g. of 30% hydrogen peroxide in the procedure of Example 3, and refluxing for twenty-four hours, there is obtained 2-tert.-butyl-10-(3-dimethylaminopropyl)phenothiazine-N,5-dioxide oxalate.

EXAMPLE 5

*2-tert.-butyl-10-(3-dimethylaminopropyl)phenothiazine-5,5-dioxide oxalate*

(a) *10-acetyl-2-tert.-butylphenothiazine.*—A mixture of 12.8 g. of 2-tert.-butylphenothiazine, 10 ml. of acetic anhydride and 5 ml. of acetyl chloride are refluxed gently for about two hours; subsequently, the mixture is concentrated in vacuo to give a residue of 10-acetyl-2-tert.-butylphenothiazine.

(b) *2-tert.-butylphenothiazine-5,5-dioxide.* — The residue from (a) is dissolved in 50 ml. of glacial acetic acid, and to the solution is added 17 g. of 30% aqueous hydrogen peroxide. The mixture is shaken thoroughly and gradually heated until a spontaneous exothermic reaction ensues. The source of heat is removed, and this reaction allowed to run its course. When this reaction has subsided, the mixture is refluxed for about two hours and then cooled. The product which separates is 2-tert.-butylphenothiazine-5,5-dioxide. The yield is about 14.4 g.

(c) *2 - tert. - butyl - 10 - (3 - dimethylaminopropyl) phenothiazine-5,5-dioxide ovalate.*—A mixture of about 14.4 g. of 2-tert.-butylphenothiazine-5,5-dioxide, 2.2 g. of sodamide, 500 ml. of dry xylene and 60 ml. of a 1 N solution of 3-dimethylaminopropyl chloride in xylene are stirred and refluxed for about eighteen hours. The mixture is allowed to cool to room temperature and filtered with suction. The filtrate is concentrated in vacuo to give a residue of 2-tert.-butyl-10-(3-dimethylaminopropyl)phenothiazine-5,5-dioxide. This product weighs about 10.7 g. To the residue is added 100 ml. of dry acetonitrile, the mixture is heated to reflux temperature, allowed to cool somewhat, and to the warm solution is added a solution of 2.4 g. of oxalic acid in 25 ml. of dry acetonitrile. An exothermic reaction occurs as the two solutions are mixed; when cooled, the product, 2-tert.-butyl - 10 - (3 - dimethylaminopropyl)phenothiazine - 5, 5-dioxide oxalate separates. The yield is about 12 g.

EXAMPLE 6

*2-tert.-butyl-10-[3-(1-pyrrolidinyl)propyl]phenothiazine hydrochloride*

By substituting 3-(1-pyrrolidinyl)propyl chloride for the 3-dimethylaminoethyl chloride in Example 1(d), there is obtained 2-tert.-butyl-10-[3-(1-pyrrolidinyl)propyl]phenothiazine, which forms a crystalline hydrochloride.

EXAMPLE 7

*2-tert.-butyl-10-(2-dimethylaminopropyl)phenothiazine hydrochloride*

By replacing the 3-dimethylaminopropyl chloride in Example 1(d) with dimethylaminoisopropyl chloride, there is obtained 2-tert.-butyl-10-(2-dimethylaminopropyl)phenothiazine. This product in ether solution with ethereal hydrogen chloride gives a crystalline hydrochloride.

EXAMPLE 8

*2-tert.-butyl-10-(2-dimethylaminoethyl)phenothiazine hydrochloride*

By replacing the 3-dimethylaminopropyl chloride in Example 1(d) with 2-dimethylaminoethyl chloride, there is obtained 2-tert.-butyl-10-(2-dimethylaminoethyl)phenothiazine, which yields a crystalline hydrochloride.

EXAMPLE 9

*2-tert.-butyl-10-[3-(1-piperazinyl)propyl]phenothiazine hydrochloride*

(a) *2 - tert. - butyl - 10 - [3 - (2 - tetrahydropyranyloxy)propyl]phenothiazine.*—By substituting 2-tetrahydropyranyl-3-chloropropyl ether, prepared by condensing dihydropyran with trimethylenechlorohydrin in the presence of a catalytic amount of hydrochloric acid, for 3-dimethylaminopropyl chloride in Example 1(d), there is obtained 2-tert.-butyl-10-[3-(2-tetrahydropyranyloxy)propyl]phenothiazine, as a viscous oil.

(b) *2 - tert. - butyl - 10 - (3 - hydroxypropyl)phenothiazine.*—A solution of 39.5 g. of 2-tert.-butyl-10-[3-(2-tetrahydropyranyloxy)propyl]phenothiazine in a mixture of 500 ml. of 75% ethyl alcohol and 10 ml. of concentrated hydrochloric acid is refluxed for one hour. The alcohol is then removed by distillation and the residual mixture extracted with ether. By concentrating the combined dried ether extracts, there is obtained 2-tert.-butyl-10-(3-hydroxypropyl)phenothiazine.

(c) *2 - tert. - butyl - 10 - (3 - chloropropyl)phenothiazine.*—To a refluxing solution of 31.3 g. of 2-tert.-butyl-10-(3-hydroxypropyl)phenothiazine in 200 ml. of dry benzene, there is added a benzene solution of 12 g. of thionyl chloride and the mixture refluxed one hour. The cooled reaction mixture is then washed with saturated sodium bicarbonate solution, dried, and the benzene evaporated. The residue is taken up in heptane, and the cooled solution is filtered from a small amount of 2-tert.-butylphenothiazine. The 2-tert.-butyl-10-(3-chloropropyl)phenothiazine is obtained from the heptane solution by first concentration, followed by vacuum distillation.

(d) *2 - tert. - butyl - 10 - [3 - (1 - piperazinyl)propyl] phenothiazine hydrochloride.*—A mixture of 33 g. of 2-tert.-butyl-10-(3-chloropropyl)phenothiazine, 43 g. of piperazine, 15 g. of sodium iodide and 500 ml. of methyl ethyl ketone is refluxed for 8 hours. The methyl ethyl ketone is then removed by distillation and the residue extracted with four 125-ml. portions of 5% hydrochloric acid.

After washing with ether, the combined acid extracts are made alkaline (pH 10) with a 20% solution of potassium carbonate while cooling with ice and the liberated oil taken up in three 250-ml. portions of ether. The combined ether extracts are washed with water, dried and concentrated. The residual oil, 2-tert.-butyl-10-[3-(1-piperazinyl)propyl]phenothiazine, when treated in ether solution with ethereal hydrogen chloride, forms a crystalline hydrochloride.

EXAMPLE 10

*2-tert.-butyl-10-[3-(4-methyl-1-piperazinyl)propyl] phenothiazine hydrochloride*

In 51 ml. of 90% formic acid is dissolved with cooling 38.1 g. of 2-tert.-butyl-10-[3-(1-piperazinyl)propyl]phenothiazine. Then 9.4 g. of 35% aqueous formaldehyde solution is added and the mixture heated in an oil bath at 85–90° for 8 hours. After cooling, 8.5 ml. of concentrated hydrochloric acid is added dropwise, and the mixture is concentrated to dryness. The residue is taken up in 500 ml. of water, made strongly alkaline and extracted with ether. Upon evaporating the ether, the viscous 2-tert.-butyl-10-[3-(4-methyl-1-piperazinyl)propyl] phenothiazine remains. When its ether solution is treated with ethereal hydrogen chloride, it forms the hydrochloride.

EXAMPLE 11

*4-[3-(2-tert.-butyl-10-phenothiazinyl)propyl]1-piperazinecarboxylic acid ethyl ester oxalic acid salt*

A mixture of 33.1 g. of 2-tert.-butyl-10-(3-chloropropyl)phenothiazine and 47.5 g. of carbethoxypiperazine is allowed to react at room temperature for seven days. The semi-crystalline mass is then extracted with two 250-ml. portions of hydrochloric acid. The combined acid extracts are made alkaline with saturated aqueous potassium carbonate solution, and the liberated base is taken up into three 250-ml. portions of ether. After washing the combined ether extracts with two 500-ml. portions of water, they are dried and the ether evaporated. The residue consists of 4-[3-(2-tert.-butyl-10-phenothiazinyl)propyl]-1-piperazinecarboxylic acid, ethyl ester; an acetonitrile solution, when treated with a solution of oxalic acid in acetonitrile or ether, gives the oxalate salt.

EXAMPLE 12

*3-tert.-butyl-10-(3-dimethylaminopropyl)phenothiazine hydrochloride*

(a) *3-tert.-butylphenothiazine.*—By replacing the 3-tert.-butyldiphenylamine in Example 1(c) with 4-tert.-butyldiphenylamine, there is obtained 3-tert.-butylphenothiazine, M.P. about 156–157° C.

(b) *3-tert.-butyl -10-(3 - dimethylaminopropyl)phenothiazine.*—By replacing the 2-tert.-butylphenothiazine in Example 1(d) with 3-tert.-butylphenothiazine, there is obtained 3-tert. - butyl-10 - (3-dimethylaminopropyl)phenothiazine, B.P. about 193–196° C. (0.1 mm.).

(c) *3-tert. - butyl-10 - (3 - dimethylaminopropyl)phenothiazine hydrochloride.*—By replacing the 2-tert.-butyl-10-(3-dimethylaminopropyl)phenothiazine in Example 1(e) with 3-tert.-butyl-10-(3-dimethylaminopropyl)phenothiazine, there is obtained 3-tert.-butyl-10-(3-dimethylaminopropyl)phenothiazine hydrochloride, M.P. about 177–178° C.

EXAMPLE 13

*3-tert.-butyl-10-(3-piperidinopropyl)phenothiazine hydrochloride*

By replacing the 3-dimethylaminopropyl chloride in Example 10(c) with 3-piperidinopropyl chloride, there is obtained 3-tert.-butyl-10-(3-piperidinopropyl)phenothiazine, which in ether solution when treated with an equivalent of ethereal hydrogen chloride forms a crystalline hydrochloride.

EXAMPLE 14

*3-tert.-butyl-10-(2-dimethylaminopropyl)phenothiazine hydrochloride*

By substituting dimethylaminoisopropyl chloride for the 3-dimethylaminopropyl chloride in Example 10(c), there is obtained 3-tert.-butyl-10-(2-dimethylaminopropyl)phenothiazine, which yields a crystalline hydrochloride.

EXAMPLE 15

*3-tert.-butyl-10-[3-(1-piperazinyl)propyl]phenothiazine hydrochloride*

By substituting 3-tert.-butyl-10-(3-chloropropyl)phenothiazine for 2-tert.-butyl-10-(3-chloropropyl)phenothiazine in Example 9(d), there is obtained 3-tert.-butyl-10-[3-(1 - piperazinyl)propyl]phenothiazine, which when treated in ether solution with an ether solution of hydrogen chloride, yields a crystalline hydrochloride.

EXAMPLE 16

*3-tert.-butyl-10-[3-(4-methyl-1-piperazinyl)propyl]phenothiazine hydrochloride*

By replacing 2 - tert. - butyl-10-[3-(1-piperazinyl)propyl]phenothiazine with 3-tert.-butyl-10-[3 - (1-piperazinyl)propyl]phenothiazine in Example 10, there is obtained 3-tert.-butyl-10-[3-(4 - methyl-1 - piperazinyl)propyl]phenothiazine, which forms a crystalline hydrochloride.

EXAMPLE 17

*4-[3-(3-tert.-butyl-10-phenothiazinyl)propyl]1-piperazinecarboxylic acid ethyl ester, oxalate*

By substituting 3-tert.-butyl-10-(3-chloropropyl)phenothiazine in Example 9 for 2-tert.-butyl-10-(3-chloropropyl)phenothiazine, there is obtained 4-[3-(3-tert.-butyl-10-phenothiazinyl)propyl]-1 - piperazinecarboxylic acid, ethyl ester which yields a crystalline oxalate.

EXAMPLE 18

*2-tert.-butyl-10-{3-[4-(2-hydroxyethyl)]-1-piperazinyl]propyl}phenothiazine dihydrochloride*

A mixture of 39.5 g. of 2-tert.-butyl-10-[3-(1-piperazinyl)propyl]phenothiazine, 13.8 g. of ethylenebromohydrin, 25 ml. of toluene and 15.2 g. of anhydrous potassium carbonate is refluxed while stirring for 5 hours. The mixture is then suspended in 500 ml. of water and extracted with three 250-ml. portions of ether. The combined ether extracts are washed with two 500-ml. portions of water and dried over anhydrous magnesium sulfate. After evaporating the ether, the residual 2-tert.-butyl-10-{3-[4-(2-hydroxyethyl) - 1 - piperazinyl]propyl} phenothiazine is vacuum distilled. This product forms a dihydrochloride when treated in ether solution with ethereal hydrogen chloride.

EXAMPLE 19

*2-tert.-butyl-8-methyl - 10-(3-dimethylaminopropyl)phenothiazine hydrochloride and 2-tert.-butyl-6-methyl-10-(3-dimethylaminopropyl)phenothiazine hydrochloride*

By substituting 2-chloro-p-toluic acid for the o-chlorobenzoic acid in the procedure of Example 1(a) and carrying out the process of sections b, c, d and e of the example, there is obtained a mixture of 2-tert.-butyl-8-methyl-10-(3-dimethylaminopropyl)phenothiazine hydrochloride and 2-tert.-butyl-6-methyl-10-(3-dimethylaminopropyl)phenothiazine hydrochloride, which can be separated by fractional crystallization from chlorobenzene.

EXAMPLE 20

*2-tert.-amyl-10-(3-dimethylaminopropyl)phenothiazine hydrochloride*

(a) *N-(3-tert.-amylphenyl)anthranilic acid.*—To a solution of 260 g. of o-chlorobenzoic acid and 67 g. of sodium hydroxide in 2 liters of amyl alcohol is added with stirring 270 g. of m-tert.-amylaniline and 7 g. of copper bronze. The mixture is slowly heated to reflux and is refluxed for about two hours, cooled, treated with a solution of 67 g. of sodium hydroxide in 700 ml. of water and steam distilled until the distillate no longer separates into two phases. The non-volatile residue is stirred with 10 g. of decolorizing carbon and filtered through a filter mat. The filtrate is adjusted to a pH of 6–7 to precipitate the N-(3-tert.-amylphenyl)anthranilic acid.

(b) *3-tert.-amyldiphenylamine.*—The product from part a, 203 g., and 21 g. of copper bronze are heated for about three hours at 250° when the evolution of carbon dioxide has ceased. The cooled mass is extracted with ether, the ether extracts are concentrated from the steam bath and the residue distilled to give 3-tert.-amyldiphenylamine.

(c) *2-tert.-amylphenothiazine.*—3-tert. - amyldiphenylamine, 119.5 g., 32 g.. of sulfur and 3.2 g.. of iodine are stirred and heated for about one hour at 150–155°, when the evolution of hydrogen sulfide has ceased. The cooled reaction product is dissolved in 225 ml. of boiling toluene and the hot solution filtered. 2-tert.-amylphenothiazine crystallizes out of the cooled filtrate.

(d) *2-tert.-amyl-10-(3-dimethylaminopropyl)phenothiazine.*—A mixture of 26.9 g. of 2-tert.-amylphenothiazine, 4.3 g. of sodamide, 120 ml. of a 1 N solution of 3-dimethylaminopropyl chloride in toluene and 400 ml. of dry toluene are stirred and refluxed for about eight hours. The product, 2-tert.-amyl-10-(3-dimethylaminopropyl)phenothiazine, is isolated by the usual procedure and is purified by distillation in vacuo.

(e) *2-tert.-amyl-10-(3-dimethylaminopropyl)phenothiazine hydrochloride.*—A solution of the distilled product from part d, 33.6 g., in 250 ml. of dry ether, is cooled and treated slowly with a slight excess of ethereal hydrogen chloride. The product which separates is rubbed until it becomes granular, filtered and recrystallized from chlorobenzene to give 2-tert.-amyl-10-(3-dimethylaminopropyl)phenothiazine hydrochloride.

The invention may be otherwise variously embodied within the scope of the appended claims.

We claim:

1. A compound selected from the class consisting of free bases of the general formula

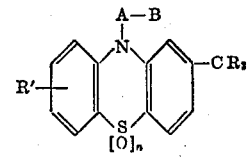

wherein A is a lower alkylene radical containing at least 2 carbon atoms in the chain, B is a basic nitrogen-containing radical of less than twelve carbon atoms selected from the group consisting of amino, (lower alkyl)amino, di(lower alkyl)amino, (hydroxy-lower alkyl)amino, di(hydroxy-lower alkyl)amino, piperidyl, (lower alkyl)piperidyl, di(lower alkyl)piperidyl, (lower alkoxy)piperidyl, pyrrolidyl, (lower alkyl)pyrrolidyl, di(lower alkyl)pyrrolidyl, (lower alkoxy)pyrrolidyl, morpholinyl, (lower alkyl)morpholinyl, di(lower alkyl)morpholinyl, (lower alkoxy)morpholinyl, thiamorpholinyl, (lower alkyl)thiamorpholinyl, di(lower alkyl)thiamorpholinyl, (lower alkoxy)thiamorpholinyl, piperazyl, (lower alkyl)piperazyl, di(lower alkyl)piperazyl, (lower alkoxy)piperazyl, and (lower carbalkoxy)piperazyl, R is lower alkyl, R′ is selected from the group consisting of hydrogen, halogen, lower alkyl, lower alkoxy and trifluoromethyl, and n is selected from the group consisting of zero, one and two; and non-toxic acid addition salts thereof.

2. A non-toxic acid-addition salt of a compound of the general formula

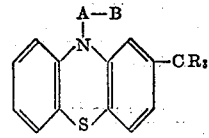

wherein A is a lower alkylene radical containing at least 2 carbon atoms in the chain, R is lower alkyl and B is di(lower alkyl)amino.

3. A non-toxic acid-addition salt of a compound of the general formula

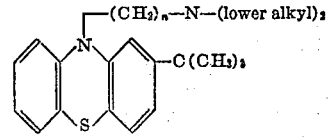

wherein n is a whole number from 2 to 8.

4. A non-toxic acid-addition salt of a compound of the general formula

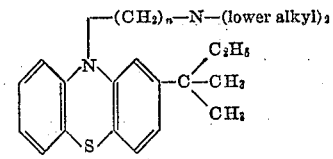

wherein n is a whole number from 2 to 8.

5. A non-toxic acid-addition salt of a compound of the general formula

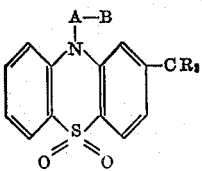

wherein A is a lower alkylene radical containing at least 2 carbon atoms in the chain, R is lower alkyl and B is di(lower alkyl)amino.

6. A non-toxic acid-addition salt of a compound of the general formula

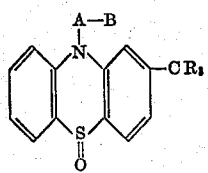

wherein A is a lower alkylene radical containing at least 2 carbon atoms in the chain, R is lower alkyl and B is di(lower alkyl)amino.

7. A non-toxic acid addition salt of a compound of the general formula

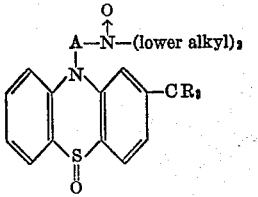

wherein A is a lower alkylene radical containing at least 2 carbon atoms in the chain, and R is lower alkyl.

8. 2 - tertiary - butyl - 10 - (3 - dimethylaminopropyl)-phenothiazine.

9. A non-toxic acid-addition salt of 2-tertiary-butyl-10-(3-dimethylaminopropyl)phenothiazine.

References Cited in the file of this patent

UNITED STATES PATENTS

| | | |
|---|---|---|
| 2,534,237 | Cusic | Dec. 19, 1950 |
| 2,629,719 | Cusic | Feb. 24, 1953 |

OTHER REFERENCES

Yale: J. Am. Chem. Soc., vol. 77 (1955), pp. 2270 to 2272.